(12) United States Patent
Chen et al.

(10) Patent No.: US 12,118,670 B2
(45) Date of Patent: Oct. 15, 2024

(54) METHOD AND DEVICE FOR GENERATING DIGITAL MODEL

(71) Applicant: SHINING 3D TECH CO., LTD., Zhejiang (CN)

(72) Inventors: Xiaojun Chen, Zhejiang (CN); Chao Ma, Zhejiang (CN); Huiquan Zhang, Zhejiang (CN)

(73) Assignee: SHINING 3D TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/014,758

(22) PCT Filed: Jul. 6, 2021

(86) PCT No.: PCT/CN2021/104753
§ 371 (c)(1),
(2) Date: Jan. 6, 2023

(87) PCT Pub. No.: WO2022/007792
PCT Pub. Date: Jan. 13, 2022

(65) Prior Publication Data
US 2023/0298271 A1    Sep. 21, 2023

(30) Foreign Application Priority Data
Jul. 6, 2020  (CN) .......................... 202010641908.6

(51) Int. Cl.
*G06T 17/20* (2006.01)
*G06T 7/10* (2017.01)

(52) U.S. Cl.
CPC .............. *G06T 17/205* (2013.01); *G06T 7/10* (2017.01); *G06T 2207/20016* (2013.01); *G06T 2207/20084* (2013.01); *G06T 2207/20221* (2013.01)

(58) Field of Classification Search
CPC ................................ G06T 17/205; G06T 7/10
See application file for complete search history.

(56) References Cited

U.S. PATENT DOCUMENTS

| 6,901,170 B1 * | 5/2005 | Terada ................. G06T 7/174 382/262 |
| 2006/0002615 A1 * | 1/2006 | Fu ........................... G06T 7/35 382/254 |

(Continued)

FOREIGN PATENT DOCUMENTS

| CN | 103413357 A | 11/2013 |
| CN | 106408620 A | 2/2017 |

(Continued)

OTHER PUBLICATIONS

International Search Report for corresponding application PCT/CN2021/104753 filed Jul. 6, 2021; Mail date Oct. 11, 2021.

(Continued)

*Primary Examiner* — Yi Yang
(74) *Attorney, Agent, or Firm* — Samson G. Yu (57) ABSTRACT

The disclosure discloses a method and device for generating a digital model. The method includes: acquiring integrated point cloud data of a measured object based on at least one set of measured object images of the measured object; performing mesh processing on the integrated point cloud data with at least two different resolutions so as to obtain at least two mesh models of the measured object; and integrating the at least two mesh models so as to generate an integrated mesh model with multiple resolutions.

18 Claims, 5 Drawing Sheets

(56) References Cited

U.S. PATENT DOCUMENTS

| | | | |
|---|---|---|---|
| 2008/0040080 A1* | 2/2008 | Bae | G06T 17/20 703/1 |
| 2009/0316966 A1 | 12/2009 | Marshall et al. | |
| 2010/0189320 A1* | 7/2010 | Dewaele | G06T 7/11 382/128 |
| 2014/0088933 A1* | 3/2014 | Kim | G16H 50/50 703/2 |
| 2014/0139639 A1* | 5/2014 | Wagner | H04N 13/204 348/46 |
| 2018/0240244 A1* | 8/2018 | Uyyala | G06T 17/10 |

FOREIGN PATENT DOCUMENTS

| | | |
|---|---|---|
| CN | 109410320 A | 3/2019 |
| WO | 2018127715 A1 | 7/2018 |

OTHER PUBLICATIONS

Zhang, Hongxin et al. "A Two-phase Approach of Progressive Mesh Reconstruction from unorganized point Clouds". International journal of CAD/CAM, Jan. 1, 2007 (Jan. 1, 2007), pp. 103-112, XP093099302.

Yang Z et al. "Adaptive triangular-mesh reconstruction by mean-curvature-based refinement from point clouds using a moving parabolic approximation". Computer-Aided Design, Elsevier Publishers BV., Barking, GB, vol. 42, No. 1, Jan. 1, 2010 (Jan. 1, 2010), pp. 2-17, XP026786546.

Hoppe Christoph et al. "Adaptive Meshing and Detail-Reduction of 3D-Point Clouds From Laser Scans". Jan. 1, 2004 (Jan. 1, 2004), XP093099304.

The search report of corresponding EP application No. 21837176.3.

* cited by examiner

METHOD AND DEVICE FOR GENERATING DIGITAL MODEL

The present disclosure claims the benefit of priority of Chinese patent application No. 2020106419086, entitled "Method and Device for Generating Digital Model", filed to China National Intellectual Property Administration on Jul. 6, 2020, the entire contents of which are incorporated herein by reference.

TECHNICAL FIELD

The embodiments of the present disclosure relate to the field of digital models, and more particularly relates to a method and device for generating a digital model.

BACKGROUND

In design and application of digital prosthodontics, there are commonly two methods for acquiring a tooth and jaw digital model: acquiring through collection by an intraoral scanner in a patient mouth, or acquiring by scanning a duplicated plaster model via a desktop scanner. In application, the digital model is commonly expected to be fine as much as possible so as to better recognize some important details, particularly margins of some repaired teeth and abutments, steps, end faces and bevels of implants, and the like.

The digital model is represented by triangular meshes, and the smallest detail degree represented by the model is decided by the minimum dot pitch of the triangular meshes. Thus, mesh models with a smaller dot pitch can better represent detail features of real teeth or restorations. But, for the same tooth and jaw model, the mesh models with a smaller dot pitch have more three-dimensional vertexes and meshes, and thus a data volume is higher; and in addition, for the mesh models with a smaller dot pitch, a higher-image-resolution scanner needs to be adopted to scan for acquiring high-resolution original point cloud data, and then highly-fine meshes are generated through a series of time-consuming processing.

In conclusion, in a case that the digital tooth and jaw model which is integrally more fine needs to be acquired, there will be two problems: 1) design software is not convenient to import due to a large model data volume; and 2) processing time for model generation during scanning is prolonged.

In order to solve the above problems, technical schemes in some related systems mainly include: a mold splitting scanning method. A tooth and jaw plaster model is cut apart, a to-be-repaired part is independently scanned into a fine mesh, other parts are additionally scanned into a coarse mesh, and then the two meshes are aligned and sewn into a whole. Accordingly, details of part of important to-be-repaired areas and a proper size of an integrated mesh model can be ensured.

Thus, the scanner is adopted in the related art to obtain a digital model of a measured object through scanning. Under general conditions, the dot pitch of the triangular meshes for representing the digital model is minimized to obtain the digital model which is integrally finer, but the manner has a technical problem of low efficiency of generating the digital model. The mold-splitting scanning method can be adopted in the related art to solve the above problem, but in a process of scanning via the method, a technical problem that the efficiency of generating the digital model cannot be improved is caused due to reduction of efficiency of scanning the measured object.

SUMMARY

According to one aspect of the embodiment of the disclosure, a method for generating a digital model is provided and includes: integrated point cloud data of a measured object is acquired based on at least one set of measured object images of the measured object; mesh processing is performed on the integrated point cloud data with at least two different resolutions so as to obtain at least two mesh models of the measured object; and the at least two mesh models are integrated so as to generate an integrated mesh model with multiple resolutions.

In some embodiments, the step of performing the mesh processing on the integrated point cloud data with at least two different resolutions so as to obtain at least two mesh models of the measured object includes: the mesh processing is performed on the integrated point cloud data with a first resolution to obtain a first mesh model of the measured object; a to-be-adjusted area in the first mesh model is determined; original point cloud data falling within the to-be-adjusted area is determined and divided from the integrated point cloud data; and performing mesh processing, with a second resolution, on the original point cloud data falling within the to-be-adjusted area to obtain a second mesh model of the to-be-adjusted area, where the integrated point cloud data includes point cloud data in the to-be-adjusted area.

In some embodiments, integrating at least two mesh models so as to generate an integrated mesh model with multiple resolutions includes: an original mesh of a to-be-adjusted area is cut away from a first mesh model to generate a to-be-sewn mesh model; and a second mesh model with the to-be-sewn mesh model is integrated to generate the integrated mesh model.

In some embodiments, information of a to-be-adjusted area includes a range and an area type of the to-be-adjusted area, where the range of the to-be-adjusted area is used for screening the to-be-adjusted area out of integrated point cloud data, and the area type is used for determining a second resolution.

In some embodiments, in a case that a first resolution is a low resolution, a first mesh model is a reconstructed coarse mesh model, and determining a to-be-adjusted area in the first mesh model includes: a recognition model is adopted to recognize a feature type from the first mesh model, and the to-be-adjusted area is determined based on the recognized feature type, where the recognition model is a neural network model based on sample training; or, the to-be-adjusted area is selected from the first mesh model based on a received selection instruction, where the to-be-adjusted area is an area needing to be subjected to fine mesh processing with a high resolution in the first mesh model.

In some embodiments, the method further includes: a non-adjustment area in a first mesh model is determined, where a mesh model of the non-adjustment area is a part, except a second mesh model, in the first mesh model.

In some embodiments, after the to-be-adjusted area in the first mesh model is determined, the method further includes: mesh processing is performed, with a third resolution, on original point cloud data falling within the to-be-adjusted area to obtain a third mesh model of the to-be-adjusted area, where the integrated point cloud data includes point cloud data in the to-be-adjusted area.

In some embodiments, in a process of adopting multiple resolutions to sequentially perform mesh processing on the integrated point cloud data, a resolution used every time is sequentially increased, and in addition, point cloud data subjected to a current mesh processing is part of point cloud data subjected to a last mesh processing.

According to another aspect of the embodiment of the disclosure, another method for generating a digital model is further provided and includes: integrated point cloud data of a measured object is acquired based on at least one set of measured object images of the measured object; mesh processing is performed on the integrated point cloud data with a first resolution to obtain a first mesh model of the measured object, where the first mesh model includes a first area needing to be subjected to mesh processing again; mesh processing is performed on original point cloud data in the first area with a second resolution to obtain a second mesh model; and the second mesh model and mesh models are integrated, except the first area, in the first mesh model to generate the integrated mesh model.

In some embodiments, in a case that the first resolution is a low resolution, the second resolution is a high resolution, the first mesh model is a coarse mesh model, and the second mesh model is a fine mesh model.

According to yet another aspect of the embodiment of the disclosure, another method for generating a digital model is further provided and includes: integrated point cloud data of a measured object is acquired based on collected multi-frame images of the measured object; mesh processing is performed on the integrated point cloud data to obtain a first mesh model of the measured object; a to-be-adjusted area is recognized in the first mesh model; original point cloud data falling within the to-be-adjusted area is acquired from the integrated point cloud data; high-resolution fine mesh processing is performed on the original point cloud data to generate a second mesh model of the to-be-adjusted area; and the second mesh model is used to replace an original mesh model of the to-be-adjusted area in the first mesh model.

According to one aspect of the embodiment of the disclosure, a device for generating a digital model is further provided and includes: a first acquisition component configured to acquire integrated point cloud data of a measured object based on at least one set of measured object images of the measured object; a first processing component configured to perform mesh processing on the integrated point cloud data with at least two different resolutions so as to obtain at least two mesh models of the measured object; and a first generation component configured to integrate the at least two mesh models so as to generate an integrated mesh model with multiple resolutions.

According to another aspect of the embodiment of the disclosure, a nonvolatile storage medium is further provided and includes stored programs. In a case that the programs run, a device where the nonvolatile storage medium is located is controlled to execute any method for generating a digital model.

According to another aspect of the embodiment of the disclosure, a processor is further provided and configured to operate programs. The programs are operated to execute any method for generating a digital model.

BRIEF DESCRIPTION

Drawings illustrated herein are used for providing further understanding for the disclosure and form a part of the disclosure. Schematic embodiments and explanations of the schematic embodiments of the disclosure are used for explaining the disclosure, which do not form improper limitations on the disclosure. In the drawings.

DETAILED DESCRIPTION

To make personnel in the technical field better understand schemes of the disclosure, technical schemes in embodiments of the disclosure are clearly and integrally described by combining drawings in the embodiments of the disclosure as below, and it is apparent that the described embodiments are merely a part rather all embodiments of the disclosure. All other embodiments obtained by those ordinarily skilled in art without creative labor based on the embodiments of the disclosure shall belong to the scope of protection of the disclosure.

It needs to be explained that terms such as "first" and "second" of Description, Claims and the above drawings of the disclosure are used for distinguishing similar objects but not necessarily used for describing specific sequences or precedence orders. It should be understood that adopted data can be exchanged under a proper situation so as to implement the embodiments, described herein, of the disclosure in sequence except the illustrated or described sequences. In addition, terms "include" and "have" and any transformations thereof intend to cover non-exclusive inclusion, for example, a process, a method, a system, a product or a device including a series of steps or units is not limited to clearly-listed steps or units while may include unclearly-listed other steps or units or other inherent steps or units of the process, the method, the product or the device.

According to the embodiment of the disclosure, a method embodiment for generating a digital model is provided. It needs to be explained that steps shown in a flowchart of the drawings may be performed in a computer system with a set of computer executable instructions. In addition, although a logical sequence is shown in the flowchart, the shown or described steps may be performed in sequence different from the sequence herein under some situations.

Figure 1:
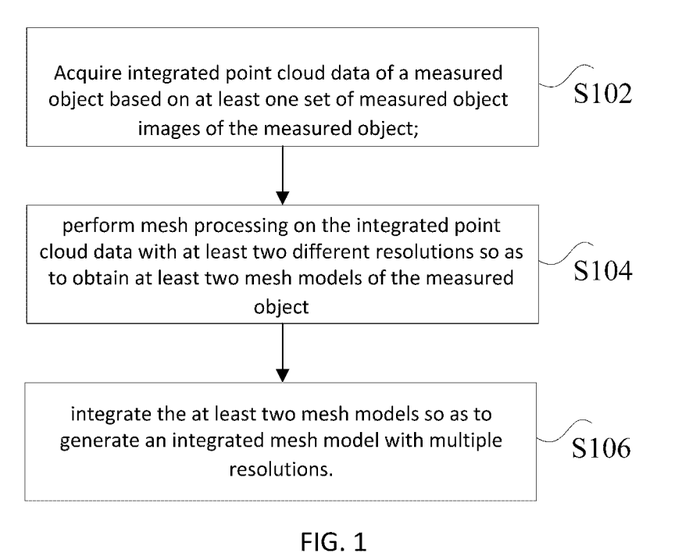
FIG. 1 is a schematic flowchart of a method for generating a digital model according to an embodiment of the disclosure.

FIG. 1 is a method for generating a digital model according to an embodiment of the disclosure. As shown in FIG. 1, the method includes following steps:

S102: Integrated point cloud data of a measured object is acquired based on at least one set of measured object images of the measured object.

S104: Mesh processing is performed on the integrated point cloud data with at least two different resolutions so as to obtain at least two mesh models of the measured object.

S106: The at least two mesh models are integrated so as to generate an integrated mesh model with multiple resolutions.

In the above method for generating the digital model, firstly, the integrated point cloud data of the measured object may be acquired based on the at least one set of measured object images of the measured object; then, mesh processing is performed on the integrated point cloud data with the at least two different resolutions so as to obtain the at least two mesh models of the measured object; and finally, the at least two mesh models are integrated so as to generate the integrated mesh model with the multiple resolutions, thereby achieving a purpose of generating the mesh three-dimensional model corresponding to the measured object without mold-splitting scanning of the measured object, achieving a technical effect of rapidly generating the mesh three-dimensional model, and then solving a technical problem that when mold-splitting scanning is adopted in the prior art, efficiency of generating the digital model cannot be improved due to reduction of efficiency of scanning the measured object.

It needs to be explained that the multiple resolutions mean that different areas are processed with different resolutions according to actual needs. Relative to a default resolution, the above two different resolutions may be considered as high resolutions when being higher than the default resolution, and may be considered as low resolutions when being lower than the default resolution. Commonly, the default resolution is set as a low resolution so as to reach a high scanning speed and perform real-time and smooth imaging.

In some embodiments, in the above step S102, a scanner device may be adopted for scanning the measured object. For example, a three-dimensional scanner is adopted, then, each set of measured images are subjected to three-dimensional reconstruction to form original single point cloud data. A piece of original single point cloud data is formed in each set of measured images. The multiple sets of measured images may form a plurality of pieces of original point cloud data. The plurality of pieces of original point cloud data may be spliced into the integrated point cloud data after being subjected to uniform coordinate system processing, and accordingly, the integrated point cloud data of the measured object is acquired.

It is easily noted that the above scanner device needs to have a high image resolution, and namely can collect highly-fine original single point cloud data through scanning. For example, an intraoral scanner with 0.3 Mega pixels or above or a desktop scanner with 1.3 Mega pixels or above may be adopted.

It needs to be explained that the original single point cloud data refers to point cloud data collected and generated by one time and one view angle, and measured objects scanned by a scanning device include false teeth, oral cavities and other images.

In the above step S104, to obtain the at least two mesh models of the measured object, in some embodiments of the disclosure, integrated point cloud data may be subjected to mesh processing with a first resolution, so that a first mesh model of the measured object is obtained; then, a to-be-adjusted area in the first mesh model is determined; original point cloud data falling within the to-be-adjusted area is determined and divided from the integrated point cloud data; and finally, the original point cloud data falling within the to-be-adjusted area is subjected to mesh processing with a second resolution, so that a second mesh model of the to-be-adjusted area is obtained. It needs to be explained that the integrated point cloud data includes point cloud data in the to-be-adjusted area.

Taking a scanning rod area (namely, an area where a scanning rod is located) being a first mesh area as an example, the scanning rod is a standard body accessory of the three-dimensional scanner for scanning a dental model. The scanning rod can be inserted into a jaw, and a position of an implant can be better positioned by scanning the standard scanning rod on the jaw.

In some embodiments, a tooth area, repair type information, a gum area and a base area are acquired by analyzing dental identification data; the scanning rod area is acquired according to the tooth area, the gum area and the base area; and first mesh data corresponding to the scanning rod area in a tooth coarse mesh three-dimensional model is separated and extracted according to the scanning rod area. In an embodiment, a three-dimensional scanner pre-determines that a scanning rod area exists in a tooth coarse mesh three-dimensional model, and first mesh data corresponding to the scanning rod area in the tooth coarse mesh three-dimensional model is separated and extracted according to the scanning rod area.

In some embodiments of the disclosure, to more rapidly perform meshing, in a case that integrated point cloud data is subjected to mesh processing with a first resolution in a incremental mesh processing manner, namely, in a case that part of original point clouds are obtained via scanning, mesh processing on the existing part of original point clouds is started; and then, in a later scanning process, original point clouds newly generated via scanning are subjected to mesh processing in an incremental manner based on previous meshes, so that a first mesh model of a measured object is obtained while a to-be-adjusted area may be subjected to universal mesh processing, namely non-incremental mesh processing.

Figure 2:
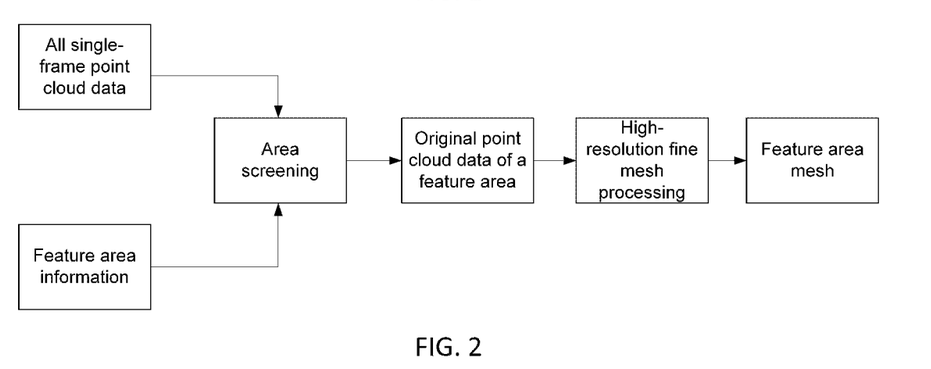
FIG. 2 is an optional flow frame diagram for generating a high-resolution fine mesh of a feature area provided by an embodiment of the disclosure.

In some embodiments of the disclosure, a to-be-adjusted area may be a feature area. As shown in FIG. 2, the embodiment of the disclosure further provides a flow frame diagram of generating a high-resolution fine mesh of a feature area. In the process, the high-resolution fine mesh of the feature area is generated through a following manner: firstly, screening all original single point cloud data areas, and namely selecting and dividing parts falling within a feature area space range from all original single point cloud data subjected to an overall optimizing process; and then, performing high-resolution fine mesh processing by the divided original single point cloud data, fusing original point clouds based on a voxel, then performing mesh extraction based on a hidden curved surface of a measured object model, acquiring a mesh model of the measured object, and then performing a series of feature-protected mesh processing to obtain the final fine mesh model, where the resolution is determined according to a size of the set voxel, and the larger the voxel, the lower the resolution is. A manner based on single mesh sewing may be adopted in the above process to generate the final fine mesh model. The multiple point clouds are respectively subjected to mesh processing after being subjected to overlap removal to obtain single meshes, and then, the multiple meshes are integrated. The feature area is commonly merely a fraction of the whole jaw, and thus, time for processing a high resolution (a small dot pitch) of a local area can be effectively controlled.

It needs to be explained that overall optimization refers to unified determining of a best space location of all the single point clouds; fusion processing refers to integrating the independent single point clouds into a uniform mesh model; and a feature protection method includes but not limited to adopting bilateral filtering, turn-up processing, and the like, but it is easily noted that the smaller a dot pitch of the mesh model, the higher the resolution is.

After the at least two mesh models of the measured object are obtained, to obtain the integrated mesh model, the at least two mesh models are integrated to generate the integrated mesh model with multiple resolutions. In some embodiments of the disclosure, an original mesh of a to-be-adjusted area can be cut away from a first mesh model to generate a to-be-sewn mesh model, and then, a second mesh model processed with a second resolution is integrated with the to-be-sewn mesh model to generate the integrated mesh model, where an integration manner includes but not limited to: integrating two mesh models by a sewing algorithm to obtain an integrated mesh model.

It needs to be explained that information of the above to-be-adjusted area includes a range and an area type of the to-be-adjusted area, where the range of the to-be-adjusted area is used for screening the to-be-adjusted area out of the integrated point cloud data, and the area type is used for determining the second resolution. In some embodiments, to determine the position information of the to-be-adjusted area, point clouds corresponding to the to-be-adjusted area can be only adopted for representing a distribution range of the feature area, and a regular stereo bounding box can also be adopted for representing the distribution range of the feature area. The range of the above to-be-adjusted area may be used for determining a fine mesh processing range, and the type of the feature area may be further used for determining resolutions of fine meshes of different areas according to application needs.

To adapt to different application scenes, some embodiments of the disclosure adopt different methods for generating a digital model. For example, during oral scanning, a strategy of increasing a resolution of a feature area is adopted to make local details more obvious. In some embodiments, when a handheld scanner performs intraoral scanning, mesh processing is firstly performed on integrated point cloud data by a default resolution to obtain a first mesh model, then, meshing is performed on the feature area with a high resolution to obtain a second mesh model, namely, the first mesh model is a low-resolution rough mesh model relative to the second mesh model, and the second mesh model is a high-resolution fine mesh model relative to the second mesh model; and then, the first mesh model and the second mesh model are integrated to obtain an integrated mesh model with multiple resolutions, namely the integrated mesh model with the low resolution and the high resolution at the same time.

In some embodiments of the disclosure, in a case that a first resolution is a low resolution, a first mesh model is a reconstructed coarse mesh model, a to-be-adjusted area in the first mesh model may be determined by a following method. For example, a recognition model may be adopted to recognize a feature type from the first mesh model, and a to-be-adjusted area is determined based on the recognized feature type, where the recognition model is a neural network model based on sample training; or, a to-be-adjusted area is selected from the first mesh model based on a received selection instruction to determine the to-be-adjusted area in the first mesh model. It needs to be explained that the to-be-adjusted area is an area needing to be subjected to fine mesh processing with a high resolution (a small dot pitch) in the first mesh model.

For example, for intraoral scanning, feature types include: a tooth, a gum, a prepared tooth, a scanning rod, and the like. In the application scene, two-level resolutions are usually adopted to make local details more obvious, a first-level-resolution mesh is formed in a real-time scanning process, after scanning is finished, a second-level-resolution mesh is generated for points corresponding to feature areas such as the prepared tooth and the scanning rod, and a second-level resolution is higher than a first-level resolution so that a resolution of the areas such as the prepared tooth and the scanning rod can be increased; and in a case that a third-level resolution is adopted, a high resolution is adopted in the feature areas such as the prepared tooth and the scanning rod, a medium resolution is adopted in the feature areas such as the tooth, and a low resolution, namely a default resolution is adopted in non-feature areas such as the gum.

For example, for false tooth scanning, feature types include one of a tooth, a gum, a prepared tooth, an abutment, an inlay and a scanning rod. A first-level-resolution mesh is generated in a real-time scanning process, after scanning is finished, a second-level-resolution mesh is generated for points corresponding to feature areas such as the prepared tooth, the abutment, the inlay and the scanning rod, and a second-level resolution is higher than a first-level resolution; and in a similar way, a third-level resolution may be adopted to process feature types in a false tooth. In some embodiments, a high resolution is adopted in feature areas such as the prepared tooth, the abutment, the inlay and the scanning rod, a medium resolution is adopted in feature areas such as the tooth, and a low resolution, namely a default resolution is adopted in the gum and other non-feature areas. It is easily noted that more different resolutions may be further adopted to process the feature types.

Figure 3:
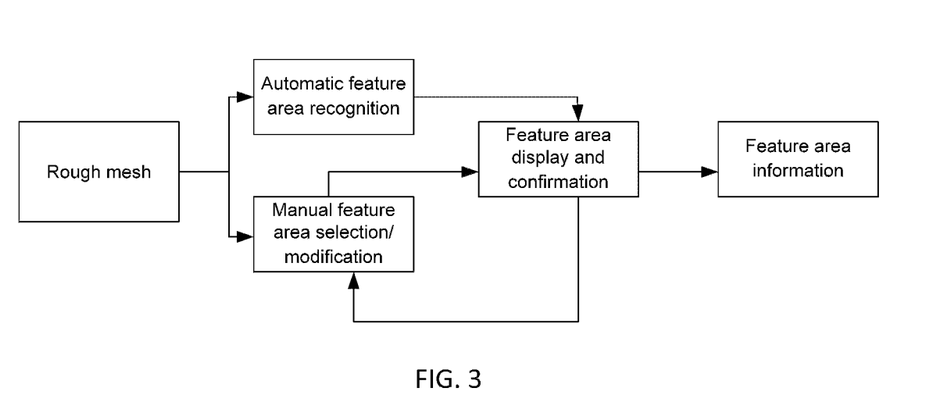
FIG. 3 is an optional flow frame diagram for determining feature area information in a coarse mesh model provided by an embodiment of the disclosure.

In some embodiments of the disclosure, the above to-be-adjusted area may be a feature area. As shown in FIG. 3, the embodiment of the disclosure provides a flow frame diagram for determining feature area information in a coarse mesh model. In some embodiments, the coarse mesh model may be automatically recognized firstly. For example, the feature area is obtained based on Artificial Intelligence (AI) training, feature mode matching and other manners; and the feature area may also be manually selected or modified. Two manners may also be combined, namely, the feature area is automatically recognized and then displayed, and then is subjected to manual interactive modification and confirmation. The generated feature area information mainly includes ranges and feature types of various adjusting areas, where the feature types include but not limited to ordinary teeth, teeth to be repaired and designed and abutments, and it needs to be explained that the coarse mesh model may be short for a rough mesh model.

Figure 4:
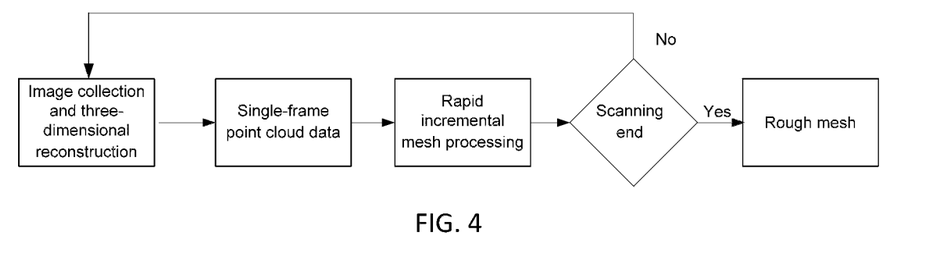
FIG. 4 is an optional flow frame diagram for generating a rough mesh provided by an embodiment of the disclosure.

Some embodiments of the disclosure further provide a flow frame diagram for generating a rough mesh. As shown in FIG. 4, single-frame point cloud data is obtained after image collection and three-dimensional reconstruction, and then the rough mesh is obtained by a rapid incremental mesh processing method. It needs to be explained that incremental mesh processing means that mesh processing is synchronously performed in a scanning process, and processing efficiency is improved in an incremental iterative processing manner. In some embodiments, only newly-scanned single point cloud data is optimized every time, a best space location of single point clouds is determined, the independent single point clouds are merged into a uniform low-resolution mesh model, and a new mesh is acquired from the mesh model. Through the manner, a mesh model of a measured object can be obtained after scanning is finished, and noise of the model is smoothly filtered so that a rough mesh model can be obtained.

In some embodiments of the disclosure, in a case that a first mesh model can satisfy practical application demands, a non-adjustment area in the first mesh model can be directly determined according to a to-be-adjusted area, and it is easily noted that a mesh model of the non-adjustment area is a part, except a second mesh model, in the first mesh model.

Figure 5:
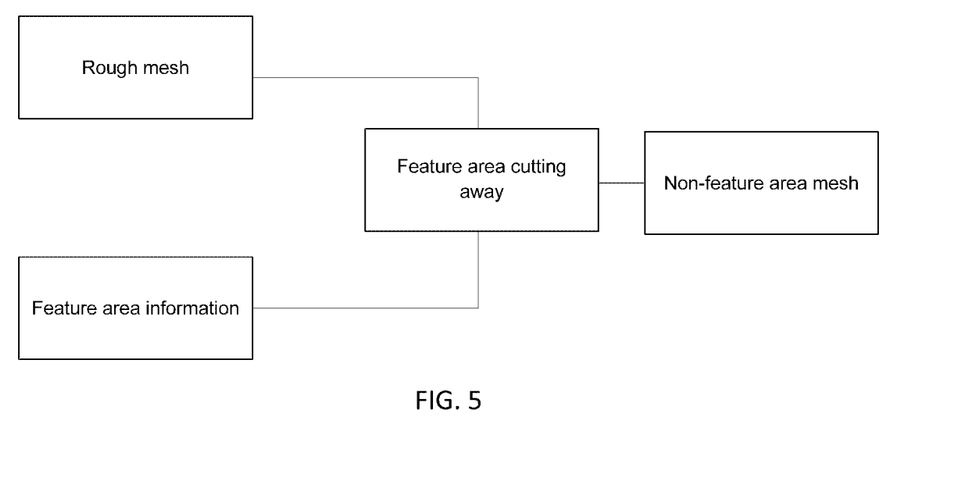
FIG. 5 is an optional flow frame diagram for generating a non-feature area mesh provided by an embodiment of the disclosure.

In some embodiments of the disclosure, a to-be-adjusted area may be a feature area, and a non-adjustment area may be a non-feature area. As shown in FIG. 5, a flow frame diagram for generating a non-feature area mesh is further provided. In the process, a feature area in a coarse mesh can be directly cut away according to area information of the feature area, and then the non-feature area mesh is obtained.

In some embodiments of the disclosure, in a case that there are a plurality of to-be-adjusted areas, after mesh processing is performed on original point cloud data in the to-be-adjusted areas with a second resolution, mesh processing may be performed, with a third resolution, on original point cloud data falling within other to-be-adjusted areas not subjected to second-resolution processing to obtain a third mesh model of the other to-be-adjusted areas, where integrated point cloud data includes point cloud data in the other to-be-adjusted areas, and it is easily noted that the other to-be-adjusted areas may be continuously processed with different resolutions.

In some embodiments of the disclosure, in a case that a first mesh model cannot satisfy practical application needs, for example: in a case that a resolution is low, after a to-be-adjusted area in the first mesh model is determined, a non-adjustment area in the first mesh model can be generated through following steps: reading integrated point cloud data, and performing fusion processing on the integrated point cloud data to obtain a fourth-resolution integrated mesh; cutting the determined to-be-adjusted area from the low-resolution integrated mesh based on information of the to-be-adjusted area to generate the non-adjustment area in the first mesh model, where the information of the to-be-adjusted area includes a range and an area type of the to-be-adjusted area, and a mesh model of the non-adjustment area is a part, except a second mesh model, in the first mesh model.

For example, application of adopting a high resolution and a low resolution for processing to generate a tooth and jaw digital model may be further popularized into a scheme of processing with a high resolution, a medium resolution and a low resolution or processing with multiple resolutions. In some embodiments of the disclosure, in a process of adopting multiple resolutions to sequentially perform mesh processing on integrated point cloud data, a resolution used every time may be sequentially increased, and in addition, point cloud data subjected to a current mesh processing is part of point cloud data subjected to a last mesh processing. Through the multi-resolution processing manner, details of an important feature area can be best embodied, and a data volume of the integrated tooth and jaw model is well controlled; and meanwhile, a speed of processing and generating an integrated tooth and jaw mesh model is effectively increased, a scanning frequency and scanning steps do not need to be increased, and thus, data processing time is greatly saved.

Figure 6:
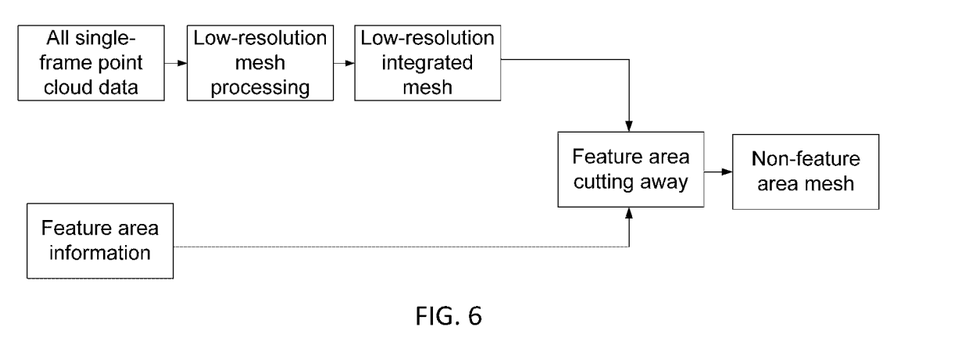
FIG. 6 is another optional flow frame diagram for generating a non-feature area mesh provided by an embodiment of the disclosure.

In some embodiments of the disclosure, a to-be-adjusted area may be a feature area, and a non-adjustment area may be a non-feature area. As shown in FIG. 6, another flow frame diagram for generating a non-feature area mesh is further provided. In the process, original single point cloud data is firstly utilized for generating a mesh model again. In some embodiments, a relatively-low-resolution mesh model is adopted to perform fusion processing on all the single point cloud data, then, a low-resolution mesh is extracted and obtained from the mesh model and then is subjected to simple smoothing treatment to obtain a low-resolution mesh model, then, a feature area part is cut away, and finally, the non-feature area mesh is obtained. The method generates the complete area mesh model again, but due to adoption of low-resolution mesh processing and simple processing, still saves a lot of processing time compared with integrated high-resolution (a small dot pitch) fine mesh processing.

Figure 7:
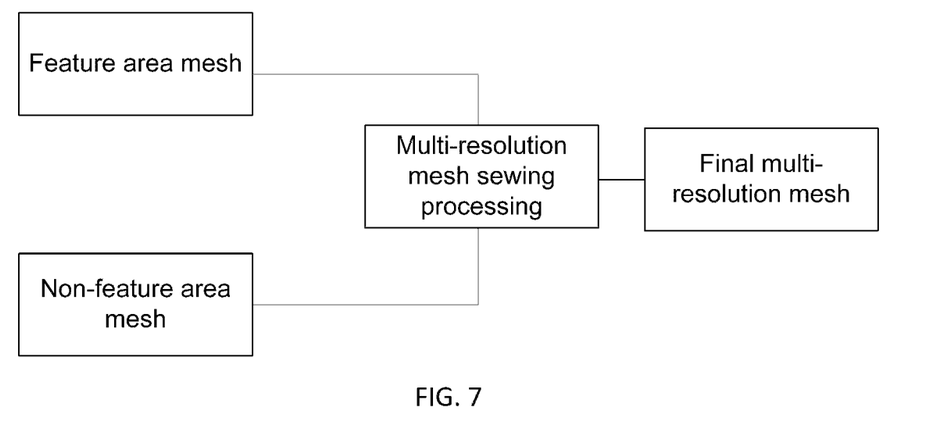
FIG. 7 is an optional flow frame diagram for generating a resolution mesh provided by an embodiment of the disclosure.

In some embodiments of the disclosure, as shown in FIG. 7, a flow frame diagram for generating a resolution mesh is further provided. In the process, firstly, according to a non-feature area and a feature area determined in the above optional embodiment, multi-resolution meshes are integrated, and finally, a multi-resolution integrated mesh model is obtained.

Figure 8:
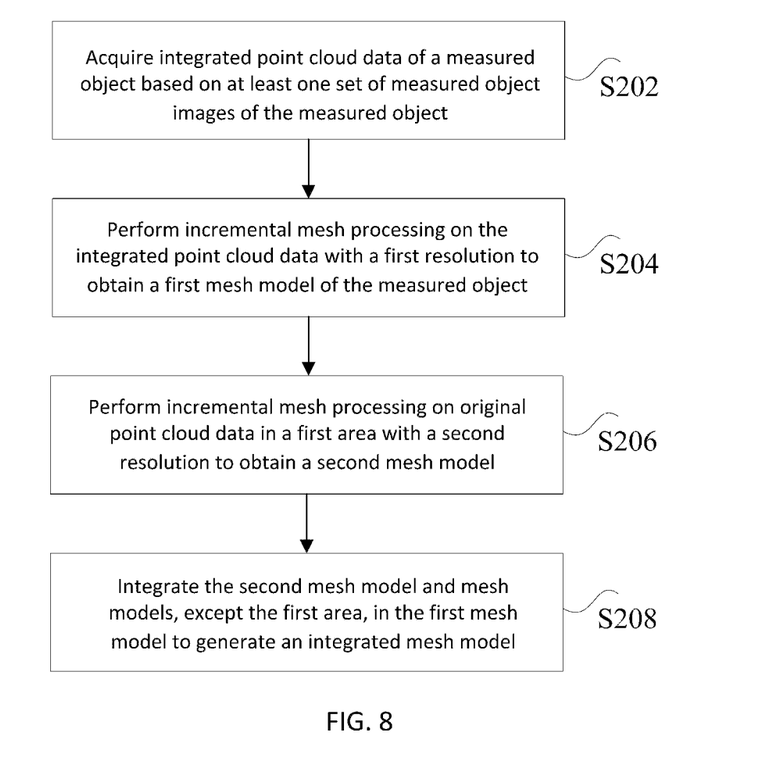
FIG. 8 is a schematic flowchart of another method for generating a digital model according to an embodiment of the disclosure.

FIG. 8 is another method for generating a digital model according to an embodiment of the disclosure. As shown in FIG. 2, the method includes following steps:

S202: Integrated point cloud data of a measured object is acquired based on at least one set of measured object images of the measured object.

S204: Mesh processing is performed on the integrated point cloud data with a first resolution to obtain a first mesh model of the measured object, where the first mesh model includes a first area needing to be subjected to mesh processing again.

S206: Mesh processing is performed on original point cloud data in the first area with a second resolution to obtain a second mesh model.

S208: The second mesh model and mesh models, except the first area, in the first mesh model are integrated to generate an integrated mesh model.

In the above method for generating the digital model, firstly, the integrated point cloud data of the measured object may be acquired based on the at least one set of measured object images of the measured object; then, mesh processing is performed on the integrated point cloud data with the first resolution so as to obtain the first mesh model of the measured object, where the first mesh model includes the first area needing to be subjected to mesh processing again; then, mesh processing is performed on the original point cloud data in the first area with the second resolution to obtain the second mesh model; and finally, the second mesh model and mesh models, except the first area, in the first mesh model are integrated to generate the integrated mesh model, thereby achieving a purpose of generating the mesh three-dimensional model corresponding to the measured object without mold-splitting scanning of the measured object, achieving a technical effect of rapidly generating the mesh three-dimensional model, and then solving a technical problem that when mold-splitting scanning is adopted in the prior art, efficiency of generating the digital model cannot be improved due to reduction of efficiency of scanning the measured object.

It needs to be explained that when the first resolution is a low resolution, the second resolution is a high resolution (a small dot pitch), the first mesh model is a coarse mesh model, and the second mesh model is a fine mesh model.

Figure 9:
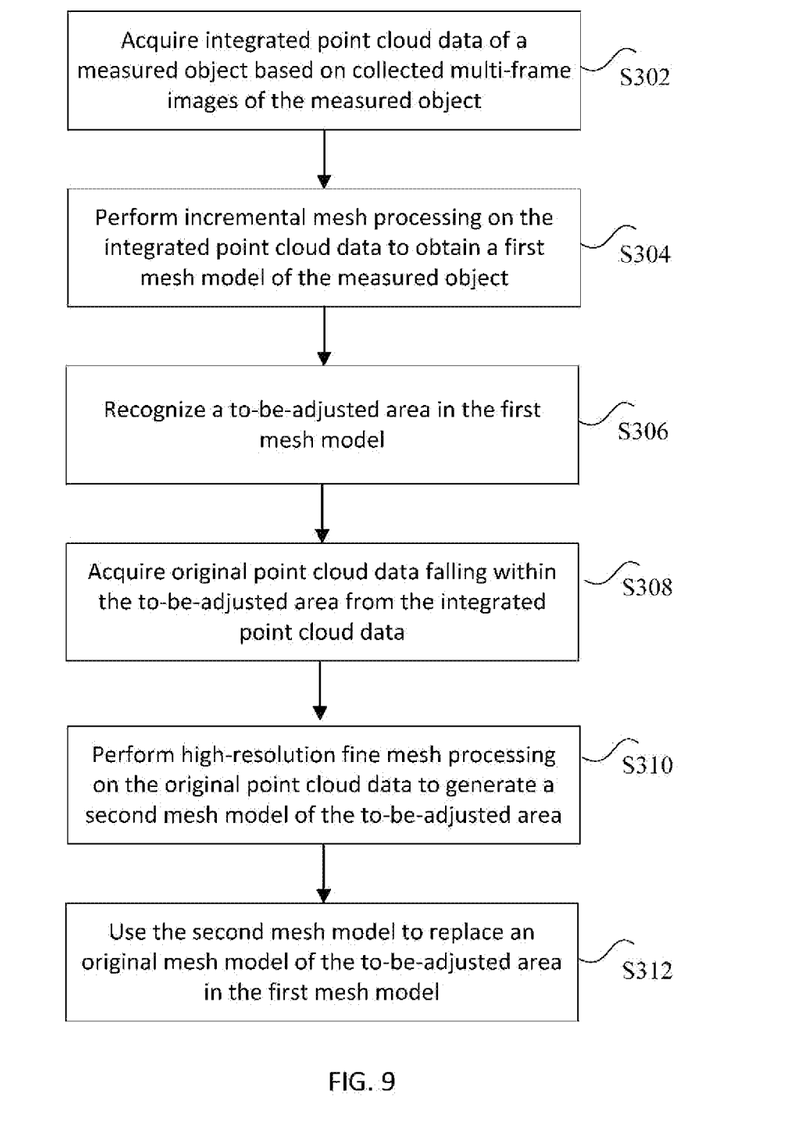
FIG. 9 is a schematic flowchart of another method for generating a digital model according to an embodiment of the disclosure.

FIG. 9 is another method for generating a digital model according to an embodiment of the disclosure. As shown in FIG. 3, the method includes following steps:

S302: Integrated point cloud data of a measured object is acquired based on collected multi-frame images of the measured object.

S304: Mesh processing is performed on the integrated point cloud data to obtain a first mesh model of the measured object.

S306: A to-be-adjusted area in the first mesh model is recognized.

S308: Original point cloud data falling within the to-be-adjusted area is acquired from the integrated point cloud data.

S310: High-resolution fine mesh processing is performed on the original point cloud data to generate a second mesh model of the to-be-adjusted area.

S312: The second mesh model is used to replace an original mesh model of the to-be-adjusted area in the first mesh model.

In the above method for generating the digital model, firstly, the integrated point cloud data of the measured object may be acquired based on the collected multi-frame images of the measured object; then, mesh processing is performed on the integrated point cloud data to obtain the first mesh model of the measured object; the to-be-adjusted area in the first mesh model is recognized; then, the original point cloud data falling within the to-be-adjusted area is acquired from the integrated point cloud data, and high-resolution fine mesh processing is performed on the original point cloud data to generate the second mesh model of the to-be-adjusted area; and finally, the second mesh model is used to replace the original mesh model of the to-be-adjusted area in the first mesh model, thereby achieving a purpose of generating the mesh three-dimensional model corresponding to the measured object without mold-splitting scanning of the measured object, achieving a technical effect of rapidly generating the mesh three-dimensional model, and then solving a technical problem that when mold-splitting scanning is adopted in the prior art, efficiency of generating the digital model cannot be improved due to reduction of efficiency of scanning the measured object.

Figure 10:
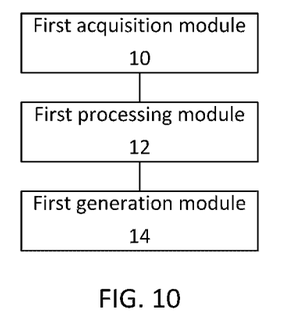
FIG. 10 is a structural schematic diagram of a device for generating a digital model according to an embodiment of the disclosure.

FIG. 10 is a device for generating a digital model according to another aspect of an embodiment of the disclosure. As shown in FIG. 10, the device includes:
 a first acquisition component 10 configured to acquire integrated point cloud data of a measured object based on at least one set of measured object images of the measured object;
 a first processing component 12 configured to perform mesh processing on the integrated point cloud data with at least two different resolutions so as to obtain at least two mesh models of the measured object; and
 a first generation component 14 configured to integrate the at least two mesh models so as to generate an integrated mesh model with multiple resolutions.

The above device for generating the digital model includes the first acquisition component 10, the first processing component 12 and the first generation component 14, where the first acquisition component 10 is configured to acquire the integrated point cloud data of the measured object based on the at least one set of measured object images of the measured object; the first processing component 12 is configured to perform mesh processing on the integrated point cloud data with the at least two different resolutions so as to obtain the at least two mesh models of the measured object; and the first generation component 14 is configured to integrate the at least two mesh models so as to generate the integrated mesh model with the multiple resolutions, thereby achieving a purpose of generating the mesh three-dimensional model corresponding to the measured object without mold-splitting scanning of the measured object, achieving a technical effect of rapidly generating the mesh three-dimensional model, and then solving a technical problem that when mold-splitting scanning is adopted in the prior art, efficiency of generating the digital model cannot be improved due to reduction of efficiency of scanning the measured object.

Figure 11:
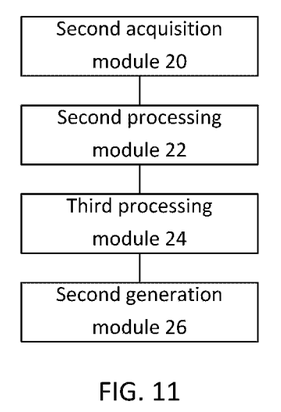
FIG. 11 is a structural schematic diagram of another device for generating a digital model according to an embodiment of the disclosure.

FIG. 11 is another device for generating a digital model according to another aspect of an embodiment of the disclosure. As shown in FIG. 11, the device includes:
 a second acquisition component 20 configured to acquire integrated point cloud data of a measured object based on at least one set of measured object images of the measured object;
 a second processing component 22 configured to perform mesh processing on the integrated point cloud data with a first resolution to obtain a first mesh model of the measured object, where the first mesh model includes a first area needing to be subjected to mesh processing again;
 a third processing component 24 configured to perform mesh processing on original point cloud data in the first area with a second resolution to obtain a second mesh model; and
 a second generation component 26 configured to integrate the second mesh model and mesh models, except the first area, in the first mesh model to generate an integrated mesh model.

The above device for generating the digital model includes the second acquisition component 20, the second processing component 22, the third processing component 24 and the second generation component 26, where the second acquisition component 20 is configured to acquire the integrated point cloud data of the measured object based on the at least one set of measured object images of the measured object; the second processing component 22 is configured to perform mesh processing on the integrated point cloud data with the first resolution to obtain the first mesh model of the measured object, where the first mesh model includes the first area needing to be subjected to mesh processing again; the third processing component 24 is configured to perform mesh processing on the original point cloud data in the first area with the second resolution to obtain a second mesh model; and the second generation component 26 is configured to integrate the second mesh model and mesh models, except the first area, in the first mesh model to generate the integrated mesh model, thereby achieving a purpose of generating the mesh three-dimensional model corresponding to the measured object without mold-splitting scanning of the measured object, achieving a technical effect of rapidly generating the mesh three-dimensional model, and then solving a technical problem that when mold-splitting scanning is adopted in the prior art, efficiency of generating the digital model cannot be improved due to reduction of efficiency of scanning the measured object.

Figure 12:
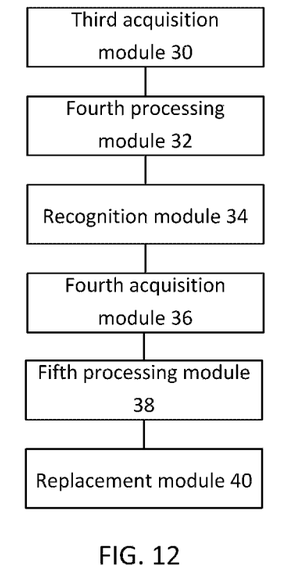
FIG. 12 is a structural schematic diagram of another device for generating a digital model according to an embodiment of the disclosure.

FIG. 12 is a device for generating a digital model according to another aspect of an embodiment of the disclosure. As shown in FIG. 12, the device includes:

- a third acquisition component 30 configured to acquire integrated point cloud data of a measured object based on collected multi-frame images of the measured object;
- a fourth processing component 32 configured to perform mesh processing on the integrated point cloud data to obtain a first mesh model of the measured object;
- a recognition component 34 configured to recognize a to-be-adjusted area in the first mesh model;
- a fourth acquisition component 36 configured to acquire original point cloud data falling within the to-be-adjusted area from the integrated point cloud data;
- a fifth processing component 38 configured to perform high-resolution fine mesh processing on the original point cloud data to generate a second mesh model of the to-be-adjusted area; and
- a replacement component 40 configured to use the second mesh model to replace an original mesh model of the to-be-adjusted area in the first mesh model.

The above device for generating the digital model includes the third acquisition component 30, the fourth processing component 32, the recognition component 34, the fourth acquisition component 36, the fifth processing component 38 and the replacement component 40, where the third acquisition component 30 is configured to acquire the integrated point cloud data of the measured object based on the collected multi-frame images of the measured object; the fourth processing component 32 is configured to perform mesh processing on the integrated point cloud data to obtain the first mesh model of the measured object; the recognition component 34 is configured to recognize the to-be-adjusted area in the first mesh model; the fourth acquisition component 36 is configured to acquire the original point cloud data falling within the to-be-adjusted area from the integrated point cloud data; the fifth processing component 38 is configured to perform high-resolution fine mesh processing on the original point cloud data to generate the second mesh model of the to-be-adjusted area; and the replacement component 40 is configured to use the second mesh model to replace the original mesh model of the to-be-adjusted area in the first mesh model, thereby achieving a purpose of generating the mesh three-dimensional model corresponding to the measured object without mold-splitting scanning of the measured object, achieving a technical effect of rapidly generating the mesh three-dimensional model, and then solving a technical problem that when mold-splitting scanning is adopted in the prior art, efficiency of generating the digital model cannot be improved due to reduction of efficiency of scanning the measured object.

According to another aspect of the embodiment of the disclosure, a nonvolatile storage medium is further provided and includes stored programs. In a case that the programs run, a device where the nonvolatile storage medium is located is controlled to execute any method for generating a digital model.

In some embodiments, the storage medium is configured to store program instructions executing following functions so as to achieve the following functions:

acquiring integrated point cloud data of a measured object based on at least one set of measured object images of the measured object; performing mesh processing on the integrated point cloud data with at least two different resolutions so as to obtain at least two mesh models of the measured object; and integrating the at least two mesh models so as to generate an integrated mesh model with multiple resolutions.

According to another aspect of the embodiment of the disclosure, a processor is further provided and configured to operate programs. The programs are operated to execute any method for generating a digital model.

In some embodiments, the processor is configured to invoke program instructions in a memory so as to achieve following functions:

acquiring integrated point cloud data of a measured object based on at least one set of measured object images of the measured object; performing mesh processing on the integrated point cloud data with at least two different resolutions so as to obtain at least two mesh models of the measured object; and integrating the at least two mesh models so as to generate an integrated mesh model with multiple resolutions.

The serial numbers of the above embodiments of the disclosure are merely used for descriptions instead of representing good or bad of the embodiments.

In the above embodiments of the disclosure, a particular emphasis is placed on a description on each embodiment, and parts not described in detail in one embodiment can refer to related descriptions in other embodiments.

It is to be understood that technical contents disclosed by the several embodiments provided by the disclosure may be realized by other manners. The above described device embodiments are merely schematic, such as unit division which may be logic function division; and during practical implementation, there may be additional division manners, for example, a plurality of units or assemblies may be combined or integrated into another system, or some characteristics may be ignored or not executed. In addition, shown or discussed mutual coupling or direct coupling or communication connection may be realized through some interfaces, and unit or component indirect coupling or communication connection may be in an electrical form or other forms.

Units described as separation components may be or may be not physically separated, and components for unit display may be or may be not physical units, may be located at the same position, or may be distributed in a plurality of units. Part or all of the units may be selected according to actual demands to achieve purposes of the schemes of the embodiments.

In addition, functional units in the embodiments of the disclosure may be integrated in one processing unit, or independently and physically exist, or two or more units may be integrated in one unit. The above integrated unit may be realized in a hardware form or a form of a software functional unit.

In a case that the integrated unit is realized in the form of the software functional unit and serve as an independent product to be sold or used, the integrated unit may be stored in a computer-readable storage medium. Based on the understanding, the technical schemes of the disclosure essentially or parts making contribution to the prior art or all or part of the technical schemes may be embodied in a software product form. A computer software product is stored in a storage medium and includes a plurality of instructions for making a computer device (a personal computer, a server, or a network device, or the like) perform all or part of the steps of the methods in the embodiments of the disclosure. The storage medium includes a U disk, a Read-Only Memory (ROM), a Random Access Memory (RAM), a mobile hard disk, a diskette or a light disk or other media capable of storing program codes.

The above contents are merely preferred implementation modes of the disclosure. It needs to be indicated that a plurality of improvements and embellishments may be made by those ordinarily skilled in the technical field without departing from the principle of the disclosure and should fall within the scope of protection of the disclosure.

INDUSTRIAL APPLICABILITY

The embodiments of the disclosure adopt a method for scanning a measured object without mold splitting, thereby achieving a purpose of generating a network model corresponding to the measured object without mold-splitting scanning of the measured object, achieving a technical effect of rapidly generating the network model, and then solving a technical problem that when mold-splitting scanning is adopted in the prior art, efficiency of generating a digital model cannot be improved due to reduction of efficiency of scanning the measured object.

What claimed is:

1. A method for generating a digital model, comprising:
   acquiring integrated point cloud data of a measured object based on at least one set of measured object images of the measured object;
   performing mesh processing on the integrated point cloud data with at least two different resolutions so as to obtain at least two mesh models of the measured object; and
   integrating the at least two mesh models so as to generate an integrated mesh model with multiple resolutions;
   wherein the step of performing the mesh processing on the integrated point cloud data with at least two different resolutions so as to obtain at least two mesh models of the measured object comprises:
   performing mesh processing on the integrated point cloud data with a first resolution to obtain a first mesh model of the measured object;
   determining a to-be-adjusted area in the first mesh model;
   determining original point cloud data falling within the to-be-adjusted area from the integrated point cloud data and dividing the original point cloud data falling within the to-be-adjusted area from the integrated point cloud data; and
   performing mesh processing, with a second resolution, on the original point cloud data falling within the to-be-adjusted area to obtain a second mesh model of the to-be-adjusted area, wherein the integrated point cloud data comprises point cloud data in the to-be-adjusted area;
   the step of performing mesh processing on the integrated point cloud data with the first resolution to obtain the first mesh model of the measured object comprises:
   in a case that part of original point clouds are obtained via scanning, starting mesh processing on the existing part of the original point cloud data;
   in a later scanning process, performing mesh processing on the original point cloud data newly generated via scanning in an incremental manner based on previous meshes, so that a first mesh model of a measured object is obtained.

2. The method as claimed in claim 1, wherein the step of integrating the at least two mesh models so as to generate an integrated mesh model with multiple resolutions comprises:
   cutting away an original mesh of the to-be-adjusted area from the first mesh model to generate a to-be-integrated mesh model; and
   integrating the second mesh model with the to-be-integrated mesh model to generate the integrated mesh model.

3. The method as claimed in claim 2, wherein when the first resolution is a low resolution, the first mesh model is a reconstructed coarse mesh model; and the step of determining the to-be-adjusted area in the first mesh model comprises:
   adopting a recognition model to recognize a feature type from the first mesh model, and determining the to-be-adjusted area based on the recognized feature type, wherein the recognition model is a neural network model based on sample training;
   selecting the to-be-adjusted area from the first mesh model based on a received selection instruction,
   wherein the to-be-adjusted area is an area needing to be subjected to fine mesh processing with a high resolution in the first mesh model.

4. The method as claimed in claim 1, wherein information of the to-be-adjusted area comprises a range and an area type of the to-be-adjusted area, the range of the to-be-adjusted area is used for screening the to-be-adjusted area out of the integrated point cloud data, and the area type is used for determining the second resolution.

5. The method as claimed in claim 4, wherein the non-adjustment area in the first mesh model is generated through following steps: reading the integrated point cloud data, and performing fusion processing on the integrated point cloud data to obtain a fourth-resolution integrated mesh; cutting a determined to-be-adjusted area from a low-resolution integrated mesh based on information of the to-be-adjusted area to generate the non-adjustment area in the first mesh model.

6. The method as claimed in claim 1, wherein when the first resolution is a low resolution, the first mesh model is a reconstructed coarse mesh model; and the step of determining the to-be-adjusted area in the first mesh model comprises:
   adopting a recognition model to recognize a feature type from the first mesh model, and determining the to-be-adjusted area based on the recognized feature type, wherein the recognition model is a neural network model based on sample training; or
   selecting the to-be-adjusted area from the first mesh model based on a received selection instruction,
   wherein the to-be-adjusted area is an area needing to be subjected to fine mesh processing with a high resolution in the first mesh model.

7. The method as claimed in claim 1, further comprising:
   determining a non-adjustment area in the first mesh model, wherein a mesh model of the non-adjustment area is a part, except the second mesh model, in the first mesh model.

8. The method as claimed in claim 1, wherein after the to-be-adjusted area in the first mesh model is determined, the method further comprises:
   performing mesh processing, with a third resolution, on the original point cloud data falling within the to-be-adjusted area to obtain a third mesh model of the to-be-adjusted area, wherein the integrated point cloud data comprises point cloud data in the to-be-adjusted area.

9. The method as claimed in claim 1, wherein in a process of adopting multiple resolutions to sequentially perform mesh processing on the integrated point cloud data, a resolution used every time is sequentially increased, and in addition, point cloud data subjected to a current mesh processing is part of point cloud data subjected to a last mesh processing.

10. A nonvolatile storage medium, comprising stored programs, wherein when the programs run, a device where the nonvolatile storage medium is located is controlled to execute the method for generating a digital model as claimed in claim 1.

11. A processor, configured to operate programs, wherein the programs are operated to execute the method for generating a digital model as claimed in claim 1.

12. The method as claimed in claim 1, wherein the step of acquiring integrated point cloud data of the measured object based on at least one set of measured object images of the measured object comprises:
   scanning, by a scanner device, the measured object;
   forming original single point cloud data by reconstructing each set of measured images in three-dimension, a piece of original single point cloud data is formed in each set of measured images;
   forming a plurality of pieces of original point cloud data by multiple sets of measured images;
   after being subjected to uniform coordinate system processing, splicing the plurality of pieces of original point cloud data to acquire the integrated point cloud data.

13. The method as claimed in claim 12, the original single point cloud data comprises: point cloud data collected and generated by one time and one view angle.

14. The method as claimed in claim 1, the second resolution is higher than the first resolution.

15. A method for generating a digital model, comprising:
   acquiring integrated point cloud data of a measured object based on at least one set of measured object images of the measured object;
   performing mesh processing on the integrated point cloud data with a first resolution to obtain a first mesh model of the measured object, wherein the first mesh model comprises a first area needing to be subjected to mesh processing again;
   performing mesh processing on original point cloud data in the first area with a second resolution to obtain a second mesh model; and
   integrating the second mesh model and mesh models, except the first area, in the first mesh model to generate an integrated mesh model;
   wherein the step of performing the mesh processing on the integrated point cloud data with at least two different resolutions so as to obtain at least two mesh models of the measured object comprises: performing mesh processing on the integrated point cloud data with a first resolution to obtain a first mesh model of the measured object; determining a to-be-adjusted area in the first mesh model; determining original point cloud data falling within the to-be-adjusted area from the integrated point cloud data and dividing the original point cloud data falling within the to-be-adjusted area from the integrated point cloud data; and performing mesh processing, with a second resolution, on the original point cloud data falling within the to-be-adjusted area to obtain a second mesh model of the to-be-adjusted area, wherein the integrated point cloud data comprises point cloud data in the to-be-adjusted area;
   the step of performing mesh processing on the integrated point cloud data with the first resolution to obtain the first mesh model of the measured object comprises: in a case that part of original point clouds are obtained via scanning, starting mesh processing on the existing part of the original point cloud data; in a later scanning process, performing mesh processing on the original point cloud data newly generated via scanning in an incremental manner based on previous meshes, so that a first mesh model of a measured object is obtained.

16. The method as claimed in claim 15, wherein in a case that the first resolution is a low resolution, the second resolution is a high resolution, the first mesh model is a coarse mesh model, and the second mesh model is a fine mesh model.

17. The method as claimed in claim 16, the first area comprises: a to-be-adjusted area; the step of integrating the second mesh model and mesh models, except the first area, in the first mesh model to generate an integrated mesh model comprises:
   using the second mesh model to replace an original mesh model of the to-be-adjusted area in the first mesh model.

18. A device for generating a digital model, comprising:
   a first acquisition component configured to acquire integrated point cloud data of a measured object based on at least one set of measured object images of the measured object;
   a first processing component configured to perform mesh processing on the integrated point cloud data with at least two different resolutions so as to obtain at least two mesh models of the measured object; and
   a first generation component configured to integrate the at least two mesh models so as to generate an integrated mesh model with multiple resolutions;
   the first processing component is further configured to: perform mesh processing on the integrated point cloud data with a first resolution to obtain a first mesh model of the measured object; determine a to-be-adjusted area in the first mesh model; determine original point cloud data falling within the to-be-adjusted area from the integrated point cloud data and dividing the original point cloud data falling within the to-be-adjusted area from the integrated point cloud data; and perform mesh processing, with a second resolution, on the original point cloud data falling within the to-be-adjusted area to obtain a second mesh model of the to-be-adjusted area, wherein the integrated point cloud data comprises point cloud data in the to-be-adjusted area;
   the first processing component is further configured to :: in a case that part of original point clouds are obtained via scanning, start mesh processing on the existing part of the original point cloud data; in a later scanning process, perform mesh processing on the original point cloud data newly generated via scanning in an incremental manner based on previous meshes, so that a first mesh model of a measured object is obtained.

* * * * *